US00RE46137E

(19) United States
(12) Reissued Patent
Jason et al.

(10) Patent Number: US RE46,137 E
(45) Date of Reissued Patent: Sep. 6, 2016

(54) PRESSURE ACTUATED PORTED SUB FOR SUBTERRANEAN CEMENT COMPLETIONS

(71) Applicant: BAKER HUGHES INCORPORATED, Houston, TX (US)

(72) Inventors: Mailand C. Jason, The Woodlands, TX (US); Justin C. Kellner, Pearland, TX (US); Charles C. Johnson, League City, TX (US); Charles T. Kirkpatrick, New Caney, TX (US); Marcus A. Avant, Kingwood, TX (US)

(73) Assignee: Baker Hughes Incorporated, Houston, TX (US)

(21) Appl. No.: 14/881,804

(22) Filed: Oct. 13, 2015

Related U.S. Patent Documents

Reissue of:
(64) Patent No.: 8,555,960
Issued: Oct. 15, 2013
Appl. No.: 13/193,902
Filed: Jul. 29, 2011

(51) Int. Cl.

| | |
|---|---|
| ***E21B 34/08*** | (2006.01) |
| ***E21B 34/06*** | (2006.01) |
| ***E21B 34/10*** | (2006.01) |
| ***E21B 33/14*** | (2006.01) |
| *E21B 34/00* | (2006.01) |

(52) U.S. Cl.
CPC ..... *E21B 34/063* (2013.01); *E21B 33/14* (2013.01); *E21B 34/10* (2013.01); *E21B 2034/007* (2013.01)

(58) Field of Classification Search
CPC ..... E21B 34/063; E21B 34/10; E21B 33/14; E21B 2034/007
See application file for complete search history.

(56) References Cited

U.S. PATENT DOCUMENTS

| | | | |
|---|---|---|---|
| 443,454 | A | 12/1890 | Kitsee |
| 3,054,415 | A | 9/1962 | Baker et al. |
| 3,189,044 | A | 6/1965 | Sizer |
| 3,442,328 | A | 5/1969 | Nutter |
| 3,662,834 | A | 5/1972 | Young |
| 3,831,680 | A | 8/1974 | Edwards et al. |
| 3,930,540 | A | 1/1976 | Holden et al. |

(Continued)

FOREIGN PATENT DOCUMENTS

| | | | |
|---|---|---|---|
| WO | WO2012115868 | A2 | 8/2012 |
| WO | WO2012145735 | A1 | 10/2012 |

OTHER PUBLICATIONS

Baker Hughes Incorporated, Product Report, Open Hole Completion Systems, "Pressure Actuated Cementing Valve" Product Family No. H30112, 2001.

(Continued)

*Primary Examiner* — Joseph Kaufman
(74) *Attorney, Agent, or Firm* — Parsons Behle & Latimer

(57) ABSTRACT

A tubing pressure operated sliding sleeve is used in cementing a tubular string. The sleeve is configured to hold closed as pressure builds to a predetermined value. When pressure is further raised a rupture disc blows and provides access to an integral piston disposed outside the sleeve. The back side of the piston is exposed to a low pressure or atmospheric chamber located between upper and lower seals. The sleeve thickness near the chamber can be made relatively thick to avoid flexing or bending under differential pressure because the net force to shift the sleeve is from differential pressure on the piston rather than the piston areas created by the upper and lower seals.

44 Claims, 2 Drawing Sheets

(56) References Cited

U.S. PATENT DOCUMENTS 3,964,544 A 6/1976 Farley et al.
3,986,554 A 10/1976 Nutter
4,109,724 A 8/1978 Barrington
4,257,484 A 3/1981 Whitley et al.
4,284,152 A * 8/1981 Adams, Jr. ..... E21B 10/64 166/212
4,330,039 A 5/1982 Vann et al.
4,403,659 A 9/1983 Upchurch
4,427,070 A * 1/1984 O'Brien ..... E21B 34/063 137/70
4,434,854 A 3/1984 Vann et al.
4,515,217 A 5/1985 Stout
4,691,779 A 9/1987 McMahan et al.
4,718,494 A 1/1988 Meek
4,907,655 A 3/1990 Hromas
4,979,569 A 12/1990 Anyan et al.
4,991,654 A 2/1991 Brandell et al.
5,044,444 A 9/1991 Coronado
5,188,183 A 2/1993 Hopmann et al.
5,325,917 A 7/1994 Szarka
5,355,959 A 10/1994 Walter et al.
5,511,617 A * 4/1996 Snider ..... E21B 34/14 166/185
5,649,597 A 7/1997 Ringgenberg
5,676,208 A 10/1997 Finley
5,765,641 A 6/1998 Shy et al.
5,810,087 A 9/1998 Patel
5,819,853 A 10/1998 Patel
5,950,733 A 9/1999 Patel
5,954,135 A 9/1999 Williamson et al.
6,109,354 A 8/2000 Ringgenberg et al.
6,148,919 A * 11/2000 Burris, II ..... E21B 34/102 166/319
6,186,227 B1 2/2001 Vaynshteyn et al.
6,220,357 B1 4/2001 Carmichael et al.
6,230,811 B1 5/2001 Ringgenberg et al.
6,286,594 B1 * 9/2001 French ..... 166/151
6,293,346 B1 9/2001 Patel
6,308,783 B2 10/2001 Pringle et al.
6,386,289 B1 5/2002 Patel
6,397,949 B1 6/2002 Walker et al.
6,550,541 B2 4/2003 Patel
6,604,582 B2 8/2003 Flowers et al.
6,659,183 B2 12/2003 Ward
6,659,186 B2 12/2003 Patel
6,684,950 B2 2/2004 Patel
6,722,439 B2 4/2004 Garay et al.
6,834,726 B2 12/2004 Giroux et al.
6,907,936 B2 6/2005 Fehr et al.
6,945,331 B2 9/2005 Patel
6,948,561 B2 9/2005 Myron
7,063,152 B2 * 6/2006 Yeo ..... E21B 33/16 166/285
7,464,758 B2 12/2008 Yeo et al.
7,562,713 B2 7/2009 Basmajian et al.
7,640,988 B2 1/2010 Phi et al.
7,703,510 B2 4/2010 Xu
7,762,324 B2 7/2010 Clem
7,841,412 B2 11/2010 Jasser et al.
7,845,416 B2 12/2010 Turner et al.
7,909,095 B2 * 3/2011 Richards et al. ..... 166/250.08
7,913,770 B2 3/2011 Schramm et al.
8,171,994 B2 5/2012 Murray et al.
8,261,761 B2 9/2012 Gerrard et al.
8,276,670 B2 10/2012 Patel
8,789,600 B2 7/2014 O'Connell et al.
9,303,501 B2 4/2016 Fehr et al.
2004/0118566 A1 * 6/2004 Krywitsky ..... E21B 29/08 166/317
2008/0066923 A1 3/2008 Xu
2009/0065194 A1 * 3/2009 Frazier ..... E21B 33/14 166/168
2009/0065212 A1 * 3/2009 DCosta ..... E21B 34/10 166/319
2010/0236781 A1 9/2010 Mytopher et al.
2011/0056679 A1 3/2011 Rytlewski
2011/0100643 A1 5/2011 Themig et al.
2011/0114324 A1 5/2011 Hayter et al.
2011/0259582 A1 * 10/2011 Krywitsky ..... E21B 34/063 166/250.08
2011/0278017 A1 11/2011 Themig et al.
2012/0006553 A1 1/2012 Korkmaz
2012/0048559 A1 3/2012 Ganguly et al.
2012/0085548 A1 * 4/2012 Fleckenstein ..... E21B 34/063 166/373
2012/0186803 A1 7/2012 Xu et al.
2012/0211242 A1 8/2012 Patel
2012/0267119 A1 10/2012 Patel
2012/0285702 A1 11/2012 Rytlewski
2012/0305265 A1 * 12/2012 Garcia ..... E21B 34/063 166/373
2013/0043041 A1 * 2/2013 McCoy ..... E21B 34/063 166/373

OTHER PUBLICATIONS

Baker Oil Tools, Sliding Sleeves, "Model CMP Non-Elastomeric Cirulating Sliding Sleeve" Product Family No. H81081, 2002.
Baker Oil Tools; Sliding Sleeves; "Model CMP "Defender" Non-Elastomeric Circulating Sliding Sleeve" Product Family No. H81082, 2002.
Otis Engineering Corportation; Production Packer Equipment and Services OT1S; "Pressure-Operated Circulating Sleeve Used With Otis Single and Dual Packer Installations" General Sales Catalog, 1985.
Halliburton; Completion Products, Second Edition, 1997.
Larimore, et al; SPE 64527; Overcoming Completion Challenges with Interventionless Devices—Case Histories of The "Disappearing Plug", Society of Petroleum Engineers Inc., 2000.
Schlumberger, KickStart Rupture Disc Valve, Date unknown, 1 page.
Delta Stim Initiator Valve Drawing, HAL24633, date unknown, 1 page.

* cited by examiner

PRESSURE ACTUATED PORTED SUB FOR SUBTERRANEAN CEMENT COMPLETIONS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

The field of the invention is a pressure actuated sleeve used in a cementing assembly that is responsive to tubing pressure to open a port and more particularly a sleeve that is associated with a piston where the piston is not referenced to annulus pressure when actuated by selective communication of tubing pressure to one side with the opposed side referenced to a low pressure chamber within the housing.

BACKGROUND OF THE INVENTION

Prior sleeves that have been deployed in cementing service have been based on the concept of providing opposed piston areas exposed to tubing pressure that are of different dimensions so that raising the tubing pressure will create a sufficient net force to in theory overcome seal friction and move the sleeve to the open position. One such design is Halliburton Initiator Sliding Sleeve that has a larger upper seal diameter than a lower seal. Raising tubing pressure creates a net differential force and the piston is allowed to move because there is an atmospheric chamber between the upper and lower seals. The problem is that to get the lower seal to be smaller than the upper seal to create the desired net force in the needed direction, the wall of the sleeve adjacent the lower seal and the atmospheric chamber has to be reduced so that the sleeve can shift while the volume of the atmospheric chamber is reduced.

The wall of the sleeve in the area of the atmospheric chamber sees substantial differential pressure and can flex or bend. When that happens the sleeve gets stuck and the desired port opening in the housing fails to occur.

Apart from these designs there are sleeves that respond to tubing pressure with an associated piston that is open on one side to tubing pressure and on the other side to annulus pressure. Such a design is illustrated in US Publication 2011/0100643. This design cannot be used in cementing applications as the filling up of the annulus with cement can block access to annulus pressure. Furthermore, there is a leak path potential from the tubing to the annulus through a piston seal leak.

Various pressure operated sleeves for downhole use are shown in U.S. Pat. Nos. and Publications: 7,703,510; 3,662,834; 4,330,039; 6,659,186; 6,550,541; 5,355,959; 4,718,494; 7,640,988; 6,386,289; US 2010/0236781 A1; U.S. Pat. Nos. 5,649,597; 5,044,444; 5,810,087; 5,950,733; 5,954,135; 6,286,594; 4,434,854 and 3,189,044.

What is needed and provided by the present invention is an actuation technique for a sliding sleeve to open a port that responds to tubing pressure but addresses the flexing or bending problem associated with prior designs so that reliable movement of the sleeve is obtained. In the preferred embodiment the application of pressure to a predetermined level actually holds the sleeve closed because the piston area on the sleeve bottom at 31 is greater than the piston area at the top of the sleeve at 32. Doing this allows the sleeve wall near the atmospheric or low pressure chamber to be strong enough to resist bending or buckling under a predetermined differential pressure. When the pressure is built up access is provided to a piston on the sleeve that is referenced to a low pressure or atmospheric chamber. This can be done with breaking a rupture disc. The sleeve can then move to open the port or ports for annulus access so that tools can be pumped down with flow without having to perforate the casing which can save a run in the hole with a perforating gun. Those skilled in the art will better appreciate more aspects of the invention from a review of the description of the preferred embodiment and the associated drawings while recognizing that the full scope of the invention is to be determined by the appended claims.

SUMMARY OF THE INVENTION

A tubing pressure operated sliding sleeve is used in cementing a tubular string. The sleeve is configured to hold closed as pressure builds to a predetermined value. When pressure is further raised a rupture disc blows and provides access to an integral piston disposed outside the sleeve. The back side of the piston is exposed to a low pressure or atmospheric chamber located between upper and lower seals. The sleeve thickness near the chamber can be made relatively thick to avoid flexing or bending under differential pressure because the net force to shift the sleeve is from differential pressure on the piston rather than the piston areas created by the upper and lower seals.

DETAILED DESCRIPTION OF THE PREFERRED EMBODIMENT

Figure 1:
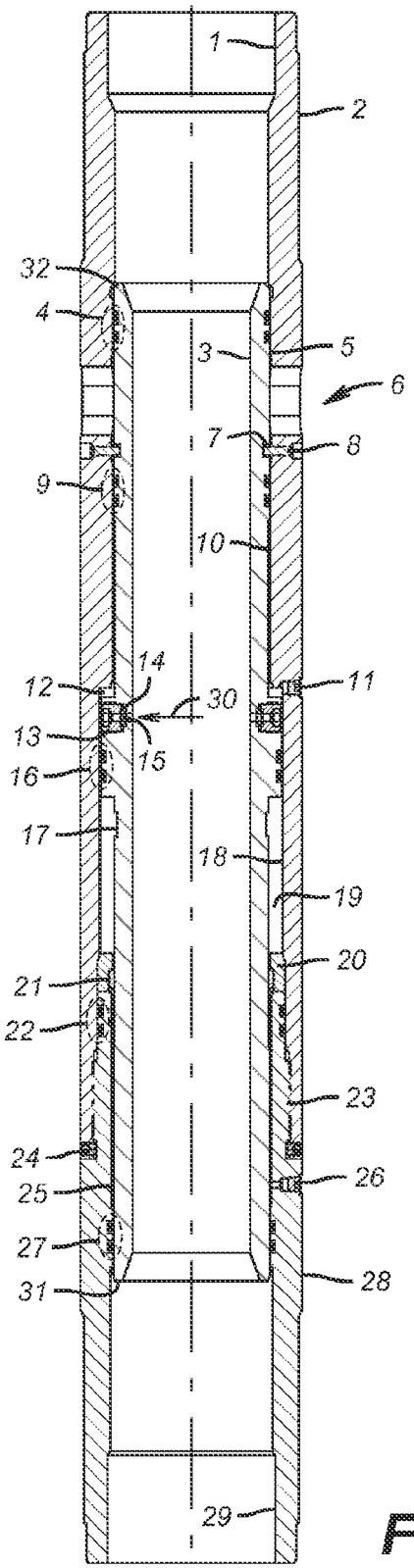
FIG. 1 is a section view of the sleeve in the ports closed position.
Figure 2:
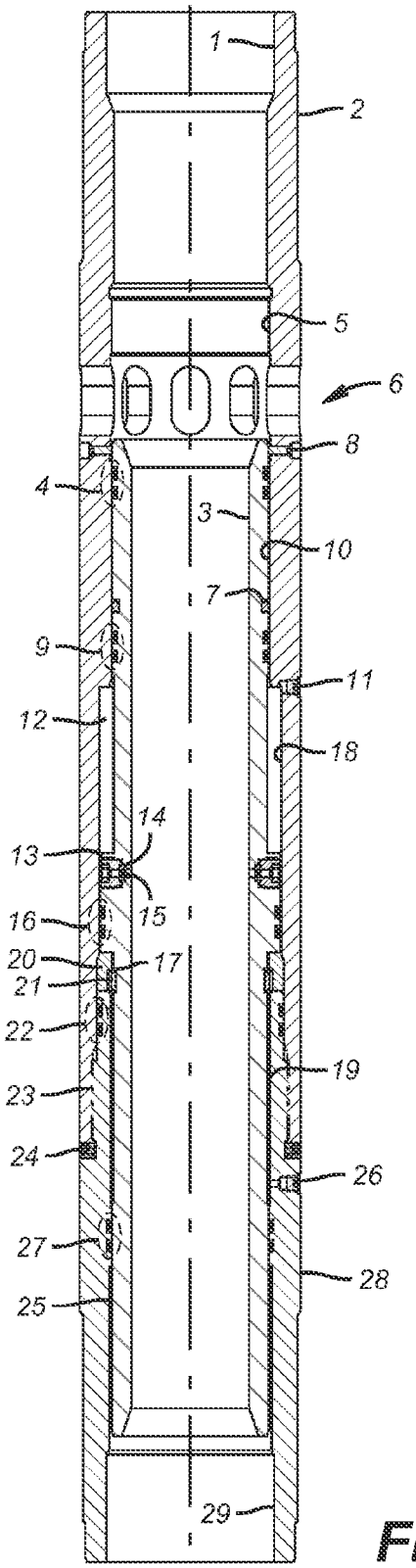
FIG. 2 is the view of FIG. 1 with the sleeve in the ports open position.
Figure 3:
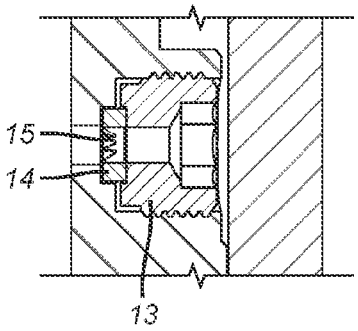
FIG. 3 is an enlarged view of the rupture disc assembly shown in FIG. 2.

Referring to FIG. 1, the apparatus has the following components:

upper body tubular connection 1;
upper ported housing 2;
inner shifting sleeve 3;
port isolation seals 4;
upper internal polished bore 5;
fluid communication ports 6;
sleeve shear screw shoulder 7;
shear screws 8;
upper internal bore piston seals 9;
intermediate internal polished bore 10;
upper pressure testing port 11;
upper atmospheric chamber 12;
burst disk load nut 13;
burst disk load ring 14;
burst disk or chemically responsive barrier 15;
intermediate internal bore piston seals and piston 16;
sleeve lock ring retention groove 17;
lower internal polished bore 18;
lower atmospheric chamber 19;
sleeve lock ring retainer 20;
sleeve lock ring 21;
body seals 22;
body connection 23;

body set screws 24;
lower sleeve polished bore 25;
lower pressure testing port 26;
lower external rod piston seals 27;
lower body 28; and
lower body tubular connection 29.

The valve is run in open-hole cementable completions just above the float equipment. The valve is connected to the casing; through the upper body tubular connection (1) at the top and the lower body tubular connection (29) at the bottom. The structural valve body is made-up of an upper ported housing (2) and lower body (28). Pressure integrity of the valve is maintained with the body seals (22). The body set screws (24) keep the body connection threads (23) from backing out during installation. Between the upper ported housing (2) and the lower body (28) is captured an inner shifting sleeve (3). The inner shifting sleeve (3) has several diameters that create piston areas that generate shifting forces to open the valve. The port isolation seals (4) located on the upper end of the inner shifting sleeve (3) and the upper internal bore piston seals (9) below the fluid communication ports (6) both act to isolate the inside of the valve during and after cementation. The larger intermediate internal bore piston seals (16) are used to drive down the inner shifting sleeve (3) along the lower internal polished bore (18) within the upper ported housing (2), once the burst disk (15) is ruptured. Both sets of seals operate within their respective polished bores (5, 10) within the upper ported housing (2). The lower external rod piston seals (27) located within the lower body (28) act to prevent cement from entering the lower atmospheric chamber (19) and wipe the outside diameter of the lower sleeve polished bore (25) during the opening of the valve. The inner shifting sleeve (3) also has a shoulder (7) that shears the shear screws (8) during the opening shift of the inner sleeve (3). An external sleeve lock ring retention groove (17) is located between the internal bore piston seals (16) and the lower sleeve polished bore (25) diameter. This recess will accept the sleeve lock ring (21) that is retained by the lock ring retainer (20) once the valve had fully opened. The sleeve lock ring (21) will prevent the inner shifting sleeve (3) from closing once the valve has fully opened.

Between the upper internal bore piston seals (9) and the intermediate internal bore piston seals (16) is created the upper atmospheric chamber (12) which contains air that can be independently tested through the upper pressure test port (11). Between the intermediate internal bore pistons seals (16) and the lower external rod piston seals (27) is created a lower atmospheric chamber (19) which also contains air that can be independently tested through a lower pressure testing port (26). A burst disk (15) is held into place within a port located on the outside of the inner shifting sleeve (3) by a load ring (14) and a load nut (13). The burst disk load nut (13) is sized to allow significant torque and load to be transferred into the burst disk (15) prior to installation of the inner shifting sleeve (3) within the valve.

The valve is run on casing and cemented into place within the well. After cementation the valve is scraped with wiper dart prior to actuation. Once the cement has set on the outside of the valve, it is ready to be opened with a combination of high hydrostatic and applied pressure. Once the burst pressure is reached, the burst disk (15) opens the upper atmospheric chamber (12) to the applied pressure. This pressure acts on the piston area created by the upper internal bore piston seals (9) and the larger intermediate internal bore piston seals (16) and drives the inner shifting sleeve (3) down compressing the air within the lower atmospheric chamber (19) and opening the fluid communication ports (6) on the upper ported housing (2). Once the inner shifting sleeve (3) is completely shifted and in contact with the upward facing shoulder on the lock ring retainer (20), the sleeve lock ring (21) falls into the sleeve lock retention groove (17) on the inner shifting sleeve (3) preventing the valve from subsequently closing.

Those skilled in the art will appreciate that the use of the rupture disc for piston access is simply the preferred way and generally more accurate than relying exclusively on shearing a shear pin. A pressure regulation valve can also be used for such selective access as well as a chemically responsive barrier that goes away in the presence of a predetermined substance or energy field, temperature downhole or other well condition for example, schematically illustrated by arrow 30, to move the sleeve. Chamber (12), once the rupture disc burst is under tubing pressure so wall flexure at that location is minimized. Even before the rupture disc breaks the size of chamber (12) is sufficiently small to avoid sleeve wall flexing in that region. The use of a large boss to support the seal (16) also strengthens the sleeve (3) immediately above the chamber (19), thus at least reducing flexing or bending that could put sleeve (3) in a bind before it fully shifted. The slightly larger dimension of seal (27) than seal (4) that holds the sleeve (3) closed initially also allows a greater wall thickness for sleeve (3) near the chamber (19) to further at least reducing flexing or bending to allow the sleeve (3) to fully shift without getting into a bind.

The piston (16) can be integral to the sleeve (3) or a separate structure. Chamber (19) has an initial pressure of atmospheric or a predetermined value less than the anticipated hydrostatic pressure within sleeve (3). The volume of chamber (19) decreases and its internal pressure rises as sleeve (3) moves to open port (6).

The above description is illustrative of the preferred embodiment and many modifications may be made by those skilled in the art without departing from the invention whose scope is to be determined from the literal and equivalent scope of the claims below.

We claim:

1. A valve for subterranean use, comprising:
a housing having a passage therethrough and a port in a wall thereof;
a sleeve having a flow path therethrough movably mounted in said passage of said housing between a first position where said port is closed and a second position where said port is at least in part open;
a piston associated with said sleeve for moving said sleeve, said piston selectively isolated from passage pressure until a predetermined pressure is reached.

2. The valve of claim 1, wherein:
said piston is integral to said sleeve.

3. The valve of claim 1, wherein:
said piston is a discrete structure from said sleeve.

4. The valve of claim 1, wherein:
said piston is selectively isolated from passage pressure by a pressure responsive barrier that opens.

5. The valve of claim 4, wherein:
said pressure responsive barrier comprises at least one rupture disc.

6. The valve of claim 5, wherein:
said piston has a first side that is selectively exposed to passage pressure and a second side opposite said first side exposed to a closed chamber in said housing.

7. The valve of claim 6, wherein:
said sleeve at least in part defines said closed chamber.

8. The valve of claim 7, wherein:

said sleeve is configured to respond to passage pressure below said predetermined level by being urged toward said first position.

9. The valve of claim 8, wherein:

said closed chamber has an initial pressure of atmospheric or a predetermined value lower than an anticipated hydrostatic pressure in said passage.

10. The valve of claim 9, wherein:

movement of said sleeve toward said second position reduces the volume of said closed chamber.

11. The valve of claim 10, wherein:

said sleeve is retained with at least one shear pin until such time as said piston is no longer isolated from passage pressure.

12. The valve of claim 1, wherein:

said piston has a first side that is selectively exposed to passage pressure and a second side opposite said first side exposed to a closed chamber in said housing.

13. The valve of claim 12, wherein:

said sleeve at least in part defines said closed chamber.

14. The valve of claim 13, wherein:

said closed chamber has an initial pressure of atmospheric or a predetermined value lower than an anticipated hydrostatic pressure in said passage.

15. The valve of claim 14, wherein:

movement of said sleeve toward said second position reduces the volume of said closed chamber.

16. The valve of claim 1, wherein:

said sleeve is configured to respond to passage pressure below said predetermined level by being urged toward said first position.

17. The valve of claim 16, wherein:

said sleeve has piston areas adjacent opposed ends defined by seals against said housing wall that are of unequal diameters.

18. The valve of claim 1, wherein:

said selective isolation is accomplished by a barrier that is undermined in response to a predetermined substance, energy field, temperature or other subterranean condition.

19. A valve for subterranean use, comprising:

a housing having a passage therethrough and a port in a wall thereof;

a sleeve having a flow path therethrough movably mounted in said housing between a first position where said port is closed and a second position where said port is at least in part open;

a piston associated with said sleeve for moving said sleeve, said piston selectively isolated from passage pressure until a predetermined pressure is reached;

said piston has a first side that is selectively exposed to passage pressure and a second side opposite said first side exposed to a closed chamber in said housing;

said first side of said piston is exposed to a second chamber in said housing.

20. The valve of claim 19, wherein:

said second chamber is defined in part by said sleeve and decreases in volume with movement of said sleeve toward said second position.

21. A valve for subterranean use, comprising:

a housing having a passage therethrough and a port in a wall thereof;

a sleeve having a flow path therethrough movably mounted in said housing between a first position where said port is closed and a second position where said port is at least in part open;

a piston associated with said sleeve for moving said sleeve, said piston selectively isolated from passage pressure until a predetermined pressure is reached;

said sleeve is retained with a selectively defeated retainer until such time as said piston is no longer isolated from passage pressure.

22. The valve of claim 21, wherein:

said retainer fails in shear.

*23. A valve for use in a cementable open-hole well comprising:*

*a housing having a passage therethrough and a port in a wall thereof for providing access from an interior of said housing to an exterior of the housing;*

*a sleeve having a longitudinal flow path therethrough movably mounted in said passage of said housing, the sleeve being movable from an initial closed position to an open position;*

*wherein when said sleeve is in said closed position the interior of said housing is isolated from the exterior of said housing and wherein when said sleeve is in said open position the port provides access from the interior of the housing to the exterior of the housing; and*

*a piston associated with said sleeve for moving said sleeve from the initial closed position to the open position, said piston selectively isolated from pressure within the passage until a predetermined pressure within the passage is reached.*

*24. The valve of claim 23, wherein said piston is integral to said sleeve.*

*25. The valve of claim 23, wherein said piston is selectively isolated from passage pressure by a pressure responsive barrier that responds to the predetermined pressure by allowing passage pressure to access said piston.*

*26. The valve of claim 25, wherein said pressure responsive barrier comprises at least one rupture disc.*

*27. The valve of claim 26, where the predetermined pressure within the passage bursts the rupture disc.*

*28. The valve of claim 27, wherein said piston has a first side that is selectively exposed to passage pressure and a second side opposite said first side exposed to a closed chamber in said housing.*

*29. The valve of claim 28, wherein said chamber has an initial pressure of atmospheric or a predetermined value lower than an anticipated hydrostatic pressure in said passage.*

*30. The valve of claim 28, wherein movement of the sleeve to said open position reduces a volume of the closed chamber.*

*31. The valve of claim 23, wherein pressure within the passage below the predetermined pressure urges the sleeve toward the closed position.*

*32. The valve of claim 23, wherein the piston is isolated from a pressure exterior of the housing.*

*33. The valve of claim 23, wherein cement may be pumped from the passage of the housing when the sleeve is in said closed position.*

*34. A method of temporarily isolating the inside of a valve from an open-hole well comprising:*

*running a valve connected to casing into an open-hole well, the valve including a housing having a passage therethrough and a port in a wall of the housing, and a sleeve positioned within the passage and movable upon exposure to a predetermined passage pressure from an initial closed position that covers the port to an open position that uncovers at least a portion of the port;*

*exposing the sleeve to the predetermined passage pressure; and*

*moving the sleeve from the initial closed position to the open position.*

*35. The method of claim 34, wherein the step of exposing the sleeve to the predetermined pressure further comprises actuating a pressure responsive barrier in the passage by exposing the pressure responsive barrier to the predetermined pressure.*

*36. The method of claim 35, wherein actuating the pressure responsive barrier comprises bursting the pressure responsive barrier to expose the sleeve to the predetermined pressure.*

*37. The method of claim 36, wherein bursting the pressure responsive barrier exposes a first side of a piston to the predetermined pressure and a second side of the piston being exposed to a closed chamber in the housing, the piston being operatively connected to the sleeve.*

*38. The method of claim 37, moving the piston to reduce a volume of the closed chamber.*

*39. The method of claim 38, wherein the closed chamber has an initial pressure that is less than the predetermined pressure.*

*40. The method of claim 39, wherein the piston is integral to the sleeve.*

*41. The method of claim 34, wherein the pressure within the passage urges the sleeve to the initial position until the pressure reaches the predetermined pressure.*

*42. The method of claim 41, further comprising shearing a shearable device prior to moving the sleeve from the initial position to the open position.*

*43. The method of claim 34, wherein the step of exposing the sleeve to the predetermined pressure further comprises actuating a chemically responsive barrier in the passage by exposing the chemically responsive barrier to a predetermined substance, energy field, or temperature.*

*44. The method of claim 34, wherein the sleeve is exposed to the predetermined pressure after a cementation process.*

* * * * *